Sept. 18, 1934.     F. A. FAUST     1,973,752

TEMPERATURE REGULATING SYSTEM

Filed Jan. 28, 1932     2 Sheets-Sheet 1

INVENTOR
FRED A. FAUST
BY
ATTORNEY

Sept. 18, 1934.  F. A. FAUST  1,973,752
TEMPERATURE REGULATING SYSTEM
Filed Jan. 28, 1932   2 Sheets-Sheet 2
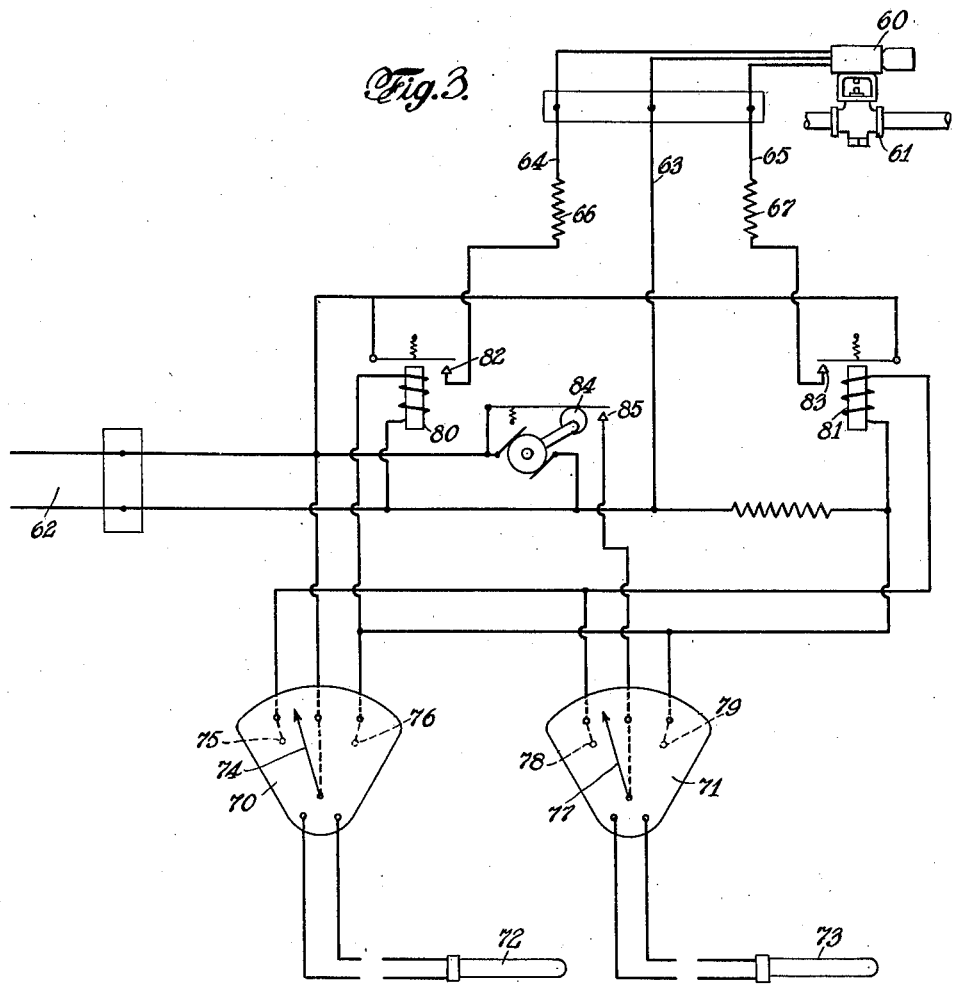
INVENTOR
FRED A. FAUST
BY
ATTORNEY Patented Sept. 18, 1934

1,973,752

UNITED STATES PATENT OFFICE 1,973,752

TEMPERATURE REGULATING SYSTEM

Fred A. Faust, Naugatuck, Conn., assignor to The Bristol Company, Waterbury, Conn., a corporation of Connecticut Application January 28, 1932, Serial No. 589,407

9 Claims. (Cl. 236—18)

The invention relates to the regulation of temperatures in heat-exchange apparatus, more particularly to apparatus adapted for the heating continuously, to a predetermined outlet temperature, of a flowing liquid medium, for example apparatus adapted to the pasteurization of milk.

In a prior U. S. Patent, #1,750,001, apparatus of this nature is disclosed and wherein the regulation is effected by locating one of a pair of thermo-sensitive elements substantially at the inlet to a liquid conduit for conveying a heating liquid and the other at a point in the conduit for the medium, such as milk, to be heated which is removed from the outlet of said conduit. The latter thermo-sensitive means is utilized as a detector of the heat requirements and is adapted to select automatically a setting, or effect a displacement, of the control points of a contact device operated by the other thermo-sensitive element. This contact device serves to regulate, in turn, the temperature of the heating liquid in accordance with the temperature requirements of the medium to be heated by controlling the admission of a heating medium to the heating liquid therefor.

In an arrangement of this nature, the controller device for the heating liquid will not be properly set if the milk is shut off, nor at the time of starting the flow of milk up to the time that the milk reaches the thermo-sensitive element. Furthermore, if it were attempted to change the location of the one thermo-sensitive element, for example, to the outlet of the milk conduit, a constant correction action would result due to the lag in effect of the heating liquid on the milk so that a more or less saw-tooth temperature curve for the outlet milk temperature would be obtained where fluctuations in the volume and temperature of the incoming milk are present and which would be greatly aggravated with heavy load changes.

In other words, the thermo-sensitive element located in the milk conduit must be placed at a point of changing temperature and not at a point where it is desired to hold the temperature constant, except, of course, where but a single fixed condition of the incoming milk obtains which requires then the control of the temperature of but a single medium.

There are certain decided advantages, nevertheless, in thus positioning one of the thermo-sensitive elements at a location substantially at the outlet of the milk, for example, it is possible to set the temperature for the outgoing medium or milk at a predetermined definite point as the pasteurization temperature, and no preliminary trials and adjustments for a proper setting are required in the field. Furthermore, it becomes possible to then obtain a record of the outlet temperature regulation through a direct connection with the same thermo-sensitive element that is located in the outgoing milk and cooperates in the control.

I have found that it is possible with a thermo-sensitive element thus located to control closely the temperature of the said outgoing milk, with the other thermo-sensitive element located in the incoming heating liquid, if the resetting feature in the control apparatus be eliminated and instead there be combined with the two said thermo-sensitive elements certain controller apparatus which will be influenced independently by each of the thermo-sensitive elements as a result of any variation of the temperature at the delivery point of the milk from the heat-exchange device and any variation of the temperature of the heating liquid.

For example, this may satisfactorily be accomplished by an independent electrical control embodying a double control for the minimum temperatures to which the thermo-sensitive elements in the respective fluids are exposed, the thermo-sensitive element in the heating liquid effecting a further control for a predetermined maximum temperature.

The invention has for a general object, in heat-exchange apparatus of the nature set forth, the provision of means for effecting a close regulation of the temperature of the medium flowing from the heat-exchange apparatus by means which are located at the outlet point of the liquid medium, or milk, and substantially at the inlet of the heat-supplying liquid and responsive to the temperatures of the respective liquids.

In carrying out the invention, two thermo-sensitive elements which are adapted to respond respectively to the varying temperatures of the two liquids, are arranged to influence independently electrical control apparatus and in such a manner that the heating liquid temperature is not solely selected by the temperature of the milk for control of the temperature of the latter on leaving the heat-exchange device.

By this expedient, the time element or lag in control is reduced to a minimum so that the temperature of the outgoing milk may be held within a very restricted range, say ¼ of 1° and for substantial load changes—of 80% of maximum capacity—and temperature variations of from 40–100° F.

The nature of the invention, however, will best be understood when described in connection with the accompanying drawings, in which:

Fig. 3 is a diagrammatic view of a modified control, together with the circuit connections involved.

Figure 1:
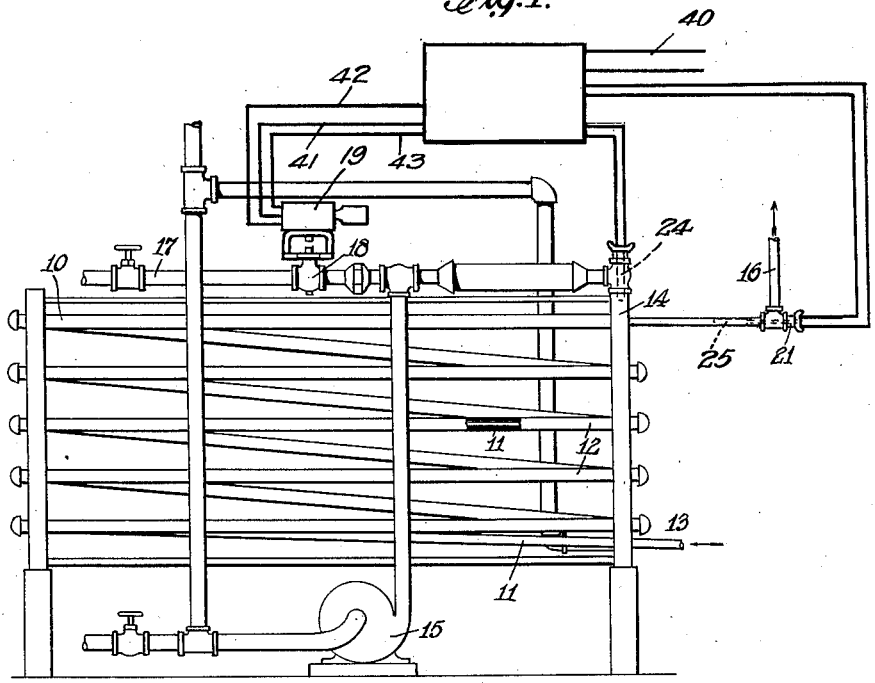
Fig. 1 is a more or less diagrammatic representation of control apparatus as associated with a heat-exchange device for maintaining a definite outlet temperature of a medium flowing continuously therethrough and heated from a heating liquid of a constant flow.

Referring to the drawings, 10 designates a heat interchange apparatus embodying generally headers and coaxial tubular members through one of which a heating liquid or fluid is designed to be circulated in a direction opposite to the flow of a liquid or fluid medium to be heated. In the present embodiment, for example, milk is caused to be circulated through the inner coil 11 while water is circulated through a surrounding coil 12, the inlet of the milk being at 13 and the inlet of the water substantially at the header 14. Water or other heating liquid is circulated in a substantially constant flow through the system as by means of the pump 15, and the milk is delivered to suitable storage tanks (not shown) or distributed from the apparatus at the outlet 16 after having been acted upon by the heating liquid to attain the desired temperature. Suitable means of any well known or special design are provided for introducing into the header 14 a heating medium to maintain the required temperature of the heating liquid necessary to heat the milk to the desired predetermined outlet temperature. For example, steam may be introduced from the main 17 through an automatically controlled valve 18 operable electrically by the reversible electric motor 19.

The arrangement is such, and as is well understood, that the heating medium will be supplied in accordance with control apparatus under the influence of a pair of thermo-sensitive elements.

In accordance with the present invention, these elements are located, the one substantially at the inlet to the heating liquid conduit or coil and the other at the outlet of the conduit or coil for the medium to be heated and may comprise thermocouples 24 and 25, the former being located in the heating liquid and the latter couple in the medium to be heated.

There is adapted to be controlled by variations of potential developed by these couples the motor 19, for example through a relay 35 having the two contacts 36 and 37, respectively, and an armature 38 normally drawn by spring 39 to the contact 36 when the solenoid of the relay coil 35 is not energized. Power for operating the motor is obtained from the mains 40, and a common lead 41 is taken directly to the motor while further leads 42 and 43, respectively, are connected to the motor, the lead 42 being designed when energized to operate the motor for opening the valve, while the lead 43 operates the motor to close said valve, all of which is well understood and forms no particular part of the present invention. Suitable resistances 44 and 45 are included in the leads 42 and 43, respectively, for regulating the desired speed of operation of the motor.

The relay 35 is under control of two contact devices 50 and 51, respectively, actuated, for example, from the thermoelectric couples 24 and 25, respectively. The former device embodies a movable contact-making arm 52 and a low contact 53 and high contact 54, while the device 51 embodies the contact-making arm 55 and a low contact 56 which corresponds to, and is adjustable to, the desired predetermined normal outlet temperature of the outgoing liquid medium.

By following the circuit connections indicated, it will readily be seen that if either arm 52 or 55 engages its corresponding low contact 53 or 56, relay 35 will be energized to close thereby a circuit at the contact 37 for energizing the lead 42 and causing thereby motor 19 to operate to open the valve 18. This valve will remain open then notwithstanding the departure of arm 52 from engagement with its corresponding aforesaid contact 53, it being understood that the motor operated valve is provided with the usual well-known limit devices. However, if the temperature of the outgoing milk should rise sufficiently to cause arm 55 to break contact at 56, the relay, of course, will become de-energized and spring 39 will cause armature 38 to engage the contact 36 and energize thereby the lead 43 to operate the motor in the reverse direction for closing the valve. So long as the valve remains open, the heating liquid will continue to receive a supply of steam, until finally the temperature to which thermoelectric couple 24 is exposed becomes sufficiently high to cause arm 52 to engage the contact 54, which effects short-circuiting of the solenoid of relay 35. This effects the release of armature 38 (if not previously released by breaking of the circuit at the contact 56) and causes the circuit to be again closed at contact 36, as hereinbefore set forth, for shutting the valve.

The action of the motor hereinbefore described is to either entirely open or entirely close the valve for admitting steam to the heating liquid, but in some instances it may be desirable to cause the valve to float between its full open and full shut positions, accommodating itself automatically to the heat requirements of the medium to be heated. That is to say, the motor may be shut off at different intermediate positions of the valve between a fully shut position and a fully open position and effecting thus a closer regulation of the temperature of the medium to be heated during periods where the load conditions remain substantially uniform. To this end, an interrupter device is arranged to be included in the respective circuits to the valve-operating motor for controlling its movement in opposite directions under certain conditions.

Figure 2:
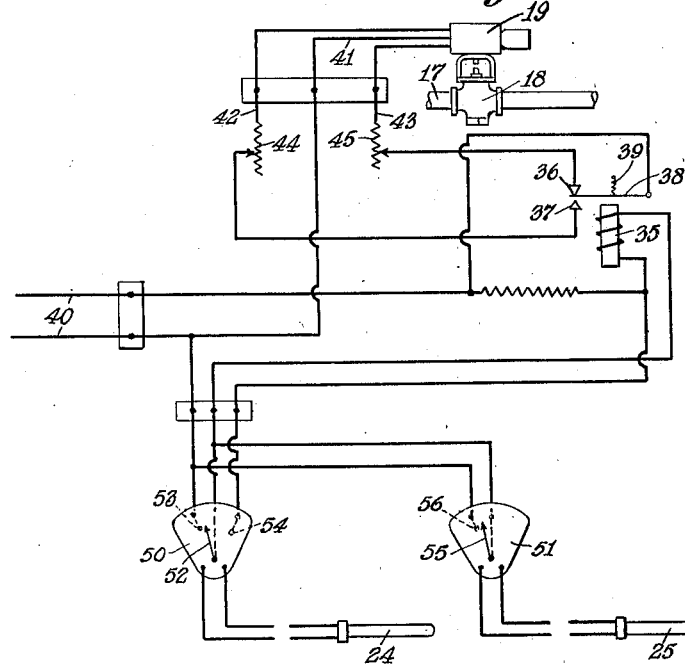
Fig. 2 is a diagrammatic view illustrating the circuit connections involved.

Referring to Fig. 3 of the drawings, a reversible electric motor 60 serves to control automatically a valve 61 to regulate the admission of steam or the like to the heat supplying liquid as in the embodiment shown in Fig. 2. Power for operating the motor is obtained from the mains 62, a common lead 63 being taken directly to the motor while further leads 64 and 65, respectively, are connected to said motor, the lead 64 being designed, when energized, to operate the motor for closing the valve while the lead 65, when energized, operates the motor to open said valve, as hereinbefore set forth. Similarly, suitable resistances 66 and 67 are included in the respective leads 64 and 65 for regulating the desired speed of operation of the motor.

The motor is under the further control of two contact devices 70 and 71, actuated, for example, from the thermoelectric couples 72 and 73, respectively. Contact device 70 embodies a movable contact-making arm 74 and a low contact point 75 and high contact point 76, while the device 71 embodies a movable contact-making arm 77 and a low contact point 78 and high contact point 79, the latter of which corresponds to, and is adjustable to, the desired predetermined normal outlet temperature of the outgoing liquid medium.

Two relays embodying the electromagnets 80 and 81, and contacts 82 and 83, respectively, are provided, both being included in series with the high contact points 76 and 79 and the latter in series with both of the low contact points 75 and 78 of the respective contact devices 70 and 71.

By following the connections indicated, it will readily be seen that if both arms 74 and 77 engage with their respective low contact points 75 and 78, power is supplied to the lead 65 for operating the motor continuously to open the same. This results from energization of electromagnet 81 to close the circuit at contact 83, and the same will effect a rapid supply of the heating medium which will be reflected more quickly in the contact device 70, causing arm 74 to leave contact point 75. As a result of the break at this point, current supply to electromagnet 81 will be interrupted and the contact 83 opened. However, due to the fact that arm 77 still engages with contact point 78 current will still be supplied to the lead 65, though intermittently as the circuit is now through the interrupter 84, of any well-known or special construction, and which is designed to periodically make and break the circuit at the contact 85, all of which is well understood.

When the temperature of the milk now increases to cause arm 77 to leave contact point 78, the energizing current for both electromagnets is cut off so that contact is also broken at the contact 82 and the motor will be shut off in either direction of its rotation, whether to open the valve or to close the same. As arm 74 continues to move toward the high contact point 76 under the continued supply of steam to the heating liquid, it will eventually engage the said contact point 76 to again energize electromagnet 80, closing thereby the circuit at contact 82 to energize the motor through lead 64 which effects a closing direction of the motor drive for its valve.

This energization will be a direct one and not through the interrupter 84 so that it will be continuous and thus more rapid. In case the milk temperature should reflect this increased temperature to an extent such that arm 77 engages the contact 79, the electromagnet 80 will be energized to also energize lead 64 for operating the motor, in this case, however, intermittently if arm 74 has left the contact point 76, and thus retard the closing action of the valve. The predominating action, however, will be to close the valve which will eventually occur, though at a retarded rate, unless the temperature drops to a sufficiently low point.

I claim:

1. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements, the one being located substantially at the inlet to the liquid conduit and the other substantially at the outlet of the medium conduit and both subject to the temperatures of the liquids flowing therethrough; controller means responsive to the thermo-sensitive elements and including two independently operating contact means actuated by the respective thermo-sensitive elements; and means for introducing a heating medium to the liquid supplied to the heating liquid conduit, an electric motor regulating said medium-introducing means and controlled through the said independently operating contact means, each of said contact means embodying a contact remaining closed for different predetermined low temperatures to which their thermo-sensitive elements are exposed, and one of said independently operating contact means embodying a further contact adapted to be closed at a predetermined temperature to which its thermo-sensitive means is exposed and above the higher of the said two predetermined low temperatures.

2. The combination with a heat exchange device: of controller apparatus embodying a motor-operated means for regulating the flow of a fluid heating medium thereto, electrical means to control the operation of said motor to respectively admit and shut off the supply of heating medium, a pair of thermo-sensitive means subjected to different temperatures of the heating device, and two sets of contact means respectively responsive to the said thermo-sensitive means for controlling the operation of said electrical means, one contact of each set remaining closed for different predetermined temperatures to which their thermo-sensitive means are exposed, and one of the sets of contact means embodying a further contact operative to bring about an opposite effect upon the electrical means at a temperature of its thermo-sensitive means different from both of the aforesaid temperatures.

3. The combination with a heat exchange device: of controller apparatus embodying a motor-operated means for regulating the flow of a fluid heating medium thereto, electrical means to control the operation of said motor to respectively admit and shut off the supply of heating medium, a pair of thermo-sensitive means subjected to different temperatures of the heating device, and two sets of contact means respectively responsive to the said thermo-sensitive means for controlling the operation of said electrical means, one contact of each set remaining closed for different predetermined temperatures to which their thermo-sensitive means are exposed, and one of the sets of contact means embodying a further contact operative to short-circuit the electrical means at a temperature of its thermo-sensitive means different from both of the aforesaid temperatures.

4. The combination with a heat exchange device: of controller apparatus embodying a motor-operated means for regulating the flow of a fluid heating medium thereto, a relay to control the operation of said motor-operated means to respectively admit and shut off the supply of heating medium, a pair of thermo-sensitive means subjected to different temperatures of the heating device, and two sets of contact means responsive to the respective thermo-sensitive means for operating said relay, one contact of each set remaining closed for different predetermined temperatures to which their thermo-sensitive means are exposed to energize thereby the relay and effect operation of the motor-operated means for admitting the supply of heating medium to the heat-exchange device, and one of the sets of contact means embodying a further contact operative to short-circuit the relay at a temperature of its thermo-sensitive means different from both of the aforesaid temperatures and to effect thereby operation of the motor-operated means to shut off the supply of heating medium to the heat-exchange device.

5. The combination with a heat exchange device: of controller apparatus embodying a motor-operated means for regulating the flow of a fluid heating medium thereto, a relay to control the operation of said motor-operated means to respectively admit and shut off the supply of heating medium, a pair of thermo-sensitive means subjected to different temperatures of the heating device, and two sets of contact means responsive to the respective thermo-sensitive means for operating said relay, one contact of each set remaining closed for different predetermined low temperatures to which their thermo-sensitive means are exposed to energize thereby the relay and effect operation of the motor-operated means for admitting the supply of heating medium to the heat-exchange device, and one of the sets of contact means embodying a further contact operative to short-circuit the relay at a predetermined temperature above the higher of the said two predetermined low temperatures and to effect thereby operation of the motor-operated means to shut off the supply of heating medium to the heat-exchange device.

6. An electric motor device, a plurality of means responsive to a condition subject to temperature changes, means regulated by said motor device for supplying a heating medium to maintain the temperature condition, electrical contact devices respectively affected by the responsive means, relays controlled thereby for determining the direction of rotation of the motor device in accordance with the action of the contact device as effected by the respective responsive devices, and a continuously operating member included in circuit with one of the relays for continuously interrupting current therethrough.

7. An electric motor device, a plurality of means responsive to a condition varying with temperature changes, means regulated by said motor device for supplying a heating medium to maintain the temperature condition, electrical contact devices respectively affected by the responsive means, relays controlled independently through said contact devices by the responsive devices for determining the direction of rotation of the motor device in accordance with the action of the contact device as effected by the respective responsive devices, and a continuously operating member included in circuit with one of the relays for continuously interrupting current therethrough.

8. An electric motor device, a plurality of means responsive to a condition varying with temperature changes, means regulated by said motor device for supplying a heating medium to maintain the temperature condition, electrical contact devices respectively affected by the responsive means, relays controlled independently and jointly through said contact devices by the responsive devices for determining the direction of rotation of the motor device in accordance with the action of the contact device as effected by the respective responsive devices, and a continuously operating member included in circuit with one of the relays for continuously interrupting current therethrough.

9. An electric motor device, a plurality of means responsive to a condition subject to temperature changes, means regulated by said motor device for supplying a heating medium to maintain the temperature condition, electrical contact devices respectively affected by the responsive means, relays controlled thereby for determining the direction of rotation of the motor device in accordance with the action of the contact device as effected by the respective responsive devices, and a continuously operating member adapted to be included in one of the respective relay circuits through the action of said contact devices for continuously interrupting current therethrough.

FRED A. FAUST.